(12) United States Patent
Simonson

(10) Patent No.: US 6,923,698 B1
(45) Date of Patent: Aug. 2, 2005

(54) LIFE PRESERVER ASSEMBLY

(76) Inventor: Peter M. Simonson, 85 Palm Ave., Miami Beach, FL (US) 33139

( * ) Notice: Subject to any disclaimer, the term of this patent is extended or adjusted under 35 U.S.C. 154(b) by 0 days.

(21) Appl. No.: 10/797,356

(22) Filed: Mar. 10, 2004

(51) Int. Cl.[7] .............................................. B63C 9/08
(52) U.S. Cl. .................................................... 441/115
(58) Field of Search ........................... 441/88, 106–124

(56) References Cited

U.S. PATENT DOCUMENTS 3,371,363 A * 3/1968 Le Blanc, Jr. .............. 441/118
3,383,722 A * 5/1968 Le Blanc, Jr. .............. 441/118
4,380,441 A * 4/1983 Harr et al. .................. 441/112

* cited by examiner

*Primary Examiner*—Jesus D. Sotelo
(74) *Attorney, Agent, or Firm*—Akerman Senterfitt

(57) ABSTRACT

A life preserver assembly includes a substantially planar main body portion formed from a buoyant material. A separation means is provided for defining at least one life preserver in the main body portion. The separation means permits the life preserver to be removed from the main body portion. A method for storing a life preserver is also disclosed.

5 Claims, 3 Drawing Sheets

LIFE PRESERVER ASSEMBLY

FIELD OF THE INVENTION

This invention relates generally to life saving devices, and more particularly to life preservers.

BACKGROUND OF THE INVENTION

Life preservers are a necessary safety precaution for boats and aircraft flying over water. The buoyant material from which many life preservers are constructed is a polymer foam which is lightweight but bulky and consequently is difficult to store on boats or planes where there is a limited amount space for storage. This sometimes results in operators not carrying life preservers, or not carrying a sufficient number of life preservers to accommodate each passenger.

SUMMARY OF THE INVENTION

A life preserver assembly includes a substantially planar main body portion formed from a buoyant material. Separation means define in the main body portion at least one life preserver. The separation means permits the life preserver to be removed from the main body portion.

The life preserver can be formed as a single unitary piece or can be formed from at least two life preserver portions. In one aspect, the life preserver can include right chest, left chest, and center back portions. Connecting structure can be provided for connecting the life preserver portions, such as the right chest portion to the center back portion and for connecting the left chest portion to the center back portion. The connecting structure can be formed from the main body portion and defined by the separation means. The connecting structure can alternatively be separate from and attachable to the life preserver portions. The connecting structure can comprise fastening structure for securing the connecting structure to the right chest, left chest, and center back portions.

The separation means can comprise any suitable structure. In one aspect, the separation means comprises scoring between the life preserver and the main body portion. The scoring can be such that the life preserver is retained within the main body portion by the contact between the life preserver and the main body portion along the score. The life preserver can be removed by pushing or punching out the life preserver from the main body portion. In another embodiment, the separation means can comprise a frangible portion defining the outline of the life preserver. Suitable structure such as a pull cord can be provided to break the frangible portion so as to permit the separation of the life preserver from the main body portion. Alternatively, fastening structure can be provided for fastening the life preserver to the main body portion.

The life preserver can comprise any suitable shape and size and can have arm hole portions. The arm hole portions are removable from the life preserver to create arm holes.

The main body portion can be elongated and comprise at least two life preservers. The elongated main body portion can serve as a mat or as a recreational flotation device. The main body portion can be segmented. Each segment can comprise a life preserver. Structure can be provided for connecting the segments.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
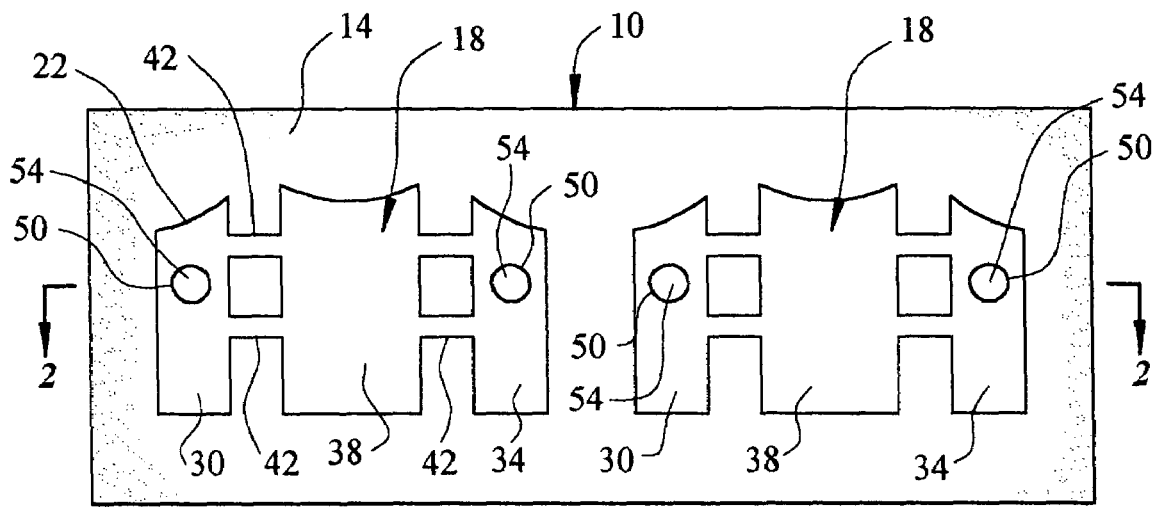
FIG. 1 is a plan view of a life preserver assembly according to the invention.
Figure 2:
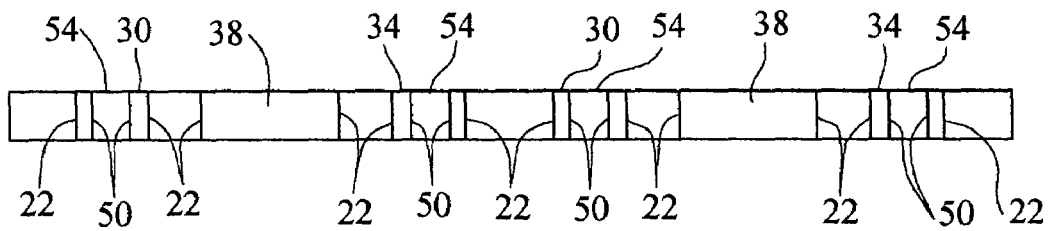
FIG. 2 is a cross section taken along the line 2—2 in FIG. 1.

There is shown in FIG. 1 a life preserver assembly 10 according to the invention. The life preserver assembly 10 includes a main body portion 14 and at least one life preserver 18. Separation means such as scoring 22 defines the outline of the life preserver 18. The scoring 22 permits the life preserver 18 to be removed from the main body portion 14 by pushing or pulling the life preserver 18 from the main body portion 14. The scoring 22 extends through the main body portion as shown in FIG. 2. It will be appreciated that the separation means can alternatively comprise perforations or partial scoring such that separation means is frangible and the life preserver 18 can be removed from the main body portion 14 with slight pressure.

The main body portion 14 and life preserver 18 can be formed from any suitable material. The material is buoyant so that the life preserver 18 can perform the life saving function. Foamed polymers which are buoyant can be used for this purpose. These materials are easily manipulated to score or perforate so as to form the separation means 22. Other materials are possible.

Figure 3:
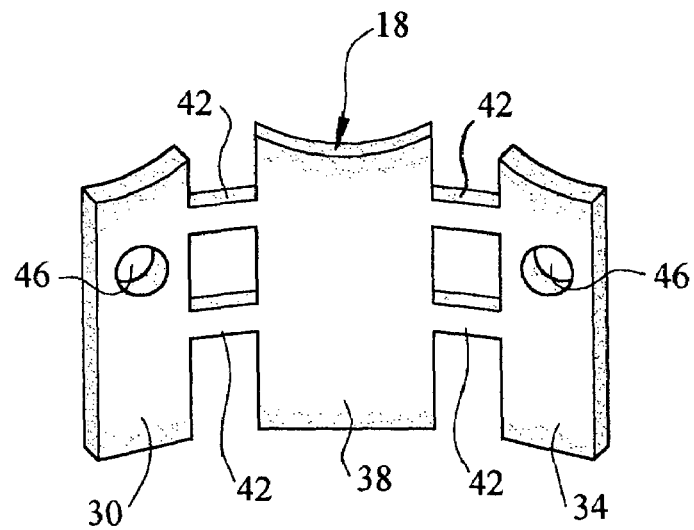
FIG. 3 is a perspective view of a life preserver according to the invention.

The life preserver 18 can be of any suitable shape or size. In the embodiments shown in FIGS. 1–3, the life preserver 18 comprises right chest portion 30, left chest portion 34, and center back portion 38. The separation means 22 can further define connecting structure 42 for connecting the right chest portion 30 to the center back portion 38, and for connecting the left chest portion 34 to the center back portion 38. Other constructions are possible. Arm hole 46 can be provided by scoring 50 in the right chest portion 30 and left chest portion 34 to permit the removal of arm hole portions 54 to form the arm holes. Other constructions are possible.

The main body portion 14 can have any suitable size or shape. In the embodiment shown in FIGS. 1–2, the main body portion is elongated so as to permit two or more life preservers 18 to be stored within the main body portion 14. This can have any suitable size but in one embodiment is approximately 6'×3'×1". This is approximately the size of most recreational flotation devices which permit the user to lie on the device while floating on water, and the life preserver assembly 10 can be used for this purpose. Alternatively, the life preserver 10 can be used as a mat or as a seat cushion. Other shapes and sizes are possible.

Figure 4:
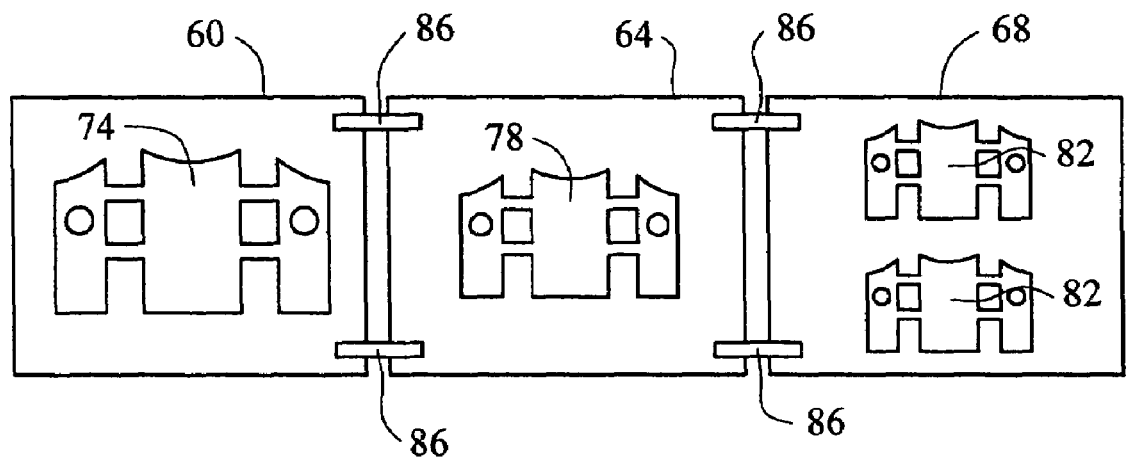
FIG. 4 is a plan view of an alternative embodiment.
Figure 5:
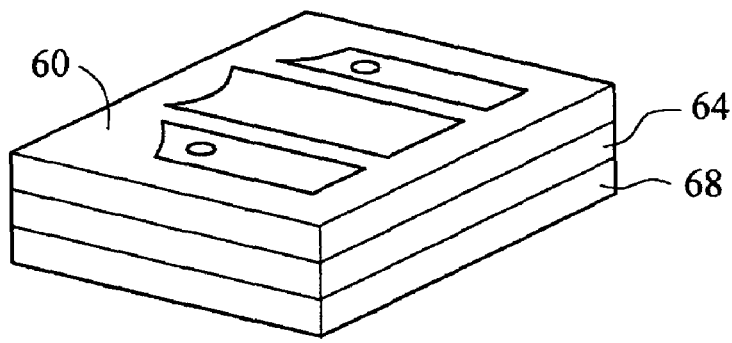
FIG. 5 is a perspective view of the embodiment of FIG. 4 and in a second configuration.

There is shown in FIG. 4 an alternative embodiment in which the main body portion is segmented into segments 60, 64 and 68. More or fewer segments are possible. The segments 60, 64 and 68 each contain at least one life preserver. The segments can contain the same life preserver, or different sizes, shapes, or types of life preservers. In one aspect the segment 60 includes an adult dimensioned life preserver 74. The segment 64 contains a child size life preserver 78. The segment 68 contains two infant sized life preservers 82. The segments are connected by connecting structure 86. The connecting structure 86 can be straps, cords, or any other suitable structure. Disassembly of the connecting structure 86 permits the segments 60, 64 and 68 to be stacked as illustrated in FIG. 5. In this configuration, the stack can function as a seat, table, or a footrest. The connecting structure can be fixed to the segments 60, 64 and 68, or can be detachable.

Figure 6:
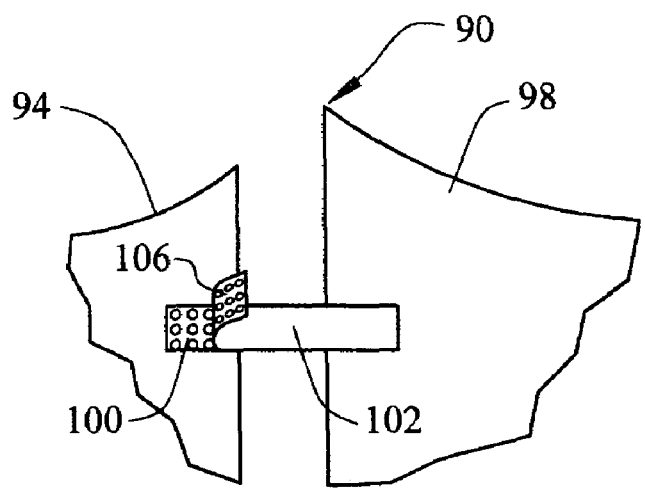
FIG. 6 is a plan view illustrating fastening structure for securing segments according to the invention.

The connecting structure for connecting the life preserver portions can vary. There is shown in FIG. 6 a life preserver 90 having a right chest portion 94 and center back portion 98. Connecting structure 102 in the form of a strap is provided. The strap 102 can have hook and loop structure 106 which cooperates with hook and loop structure 110 on the right chest portion 94 and center back portion 98. The life preserver 90 is removed from the main body portion and the strap 102 is fixed to the cooperating hoop and loop structure 110 on each of the life preserver portions so as to connect the life preserver portions to form the life preserver 90. Alternative connecting structure and fastening structure for securing the connecting structure is possible, such as snaps, buttons and the like.

Figure 7:
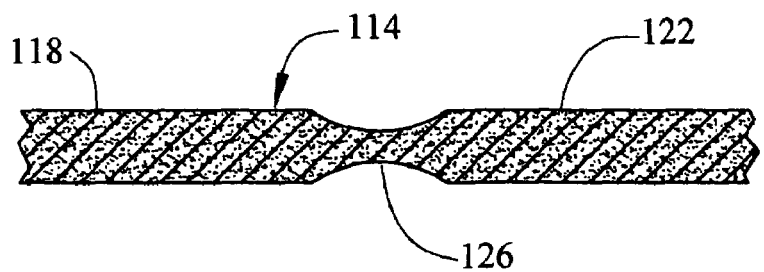
FIG. 7 is a cross-section illustrating separation means according to one aspect of the invention.

The separation means can be any suitable structure for permitting the life preserver to be removed from the main body portion. There is shown in FIG. 7 a portion of a life preserver 114 including a right chest portion 118 and a center back portion 122. A thinned portion 126 is provided and connects the right chest portion 118 to the center back portion 122. The thinned portion 126 is frangible and can be broken to separate the right chest portion 118 from the center back portion 122.

Figure 8:
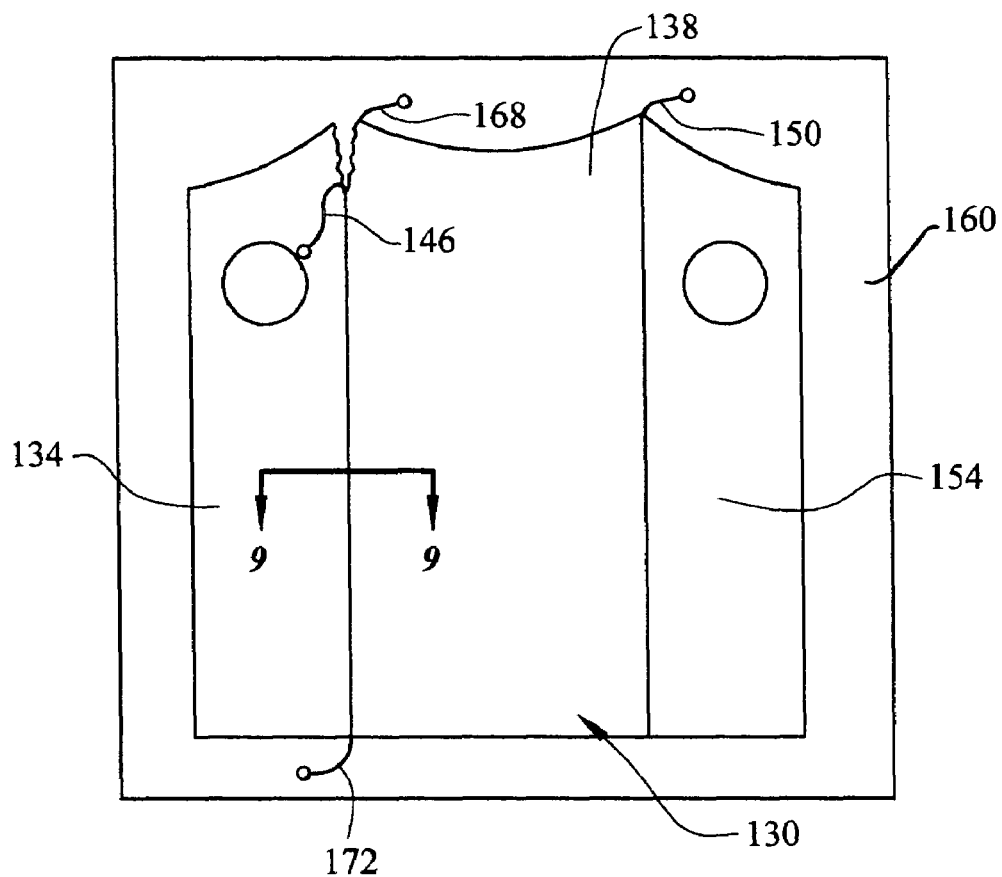
FIG. 8 is a cross-section illustrating alternative separation means.
Figure 9:
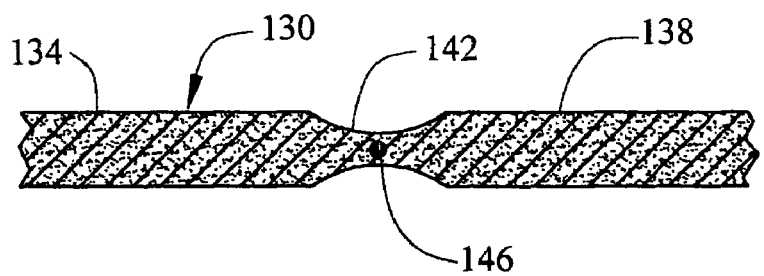
FIG. 9 is a plan view illustrating the use of the separation means of FIG. 8.

The separation means can comprise structure for breaking or disconnecting the life preserver portions from the main body portion and from one another. There is shown in FIGS. 8–9 a life preserver 130 in which a right chest portion 134 is separated from the center back portion 138 by separation means 142, which can include a thinned, perforated, or scored portion. A pull tab 146 is provided. The pull tab 146 can be utilized to separate the right chest portion 134 from the center back portion 138. A similar pull tab 150 can be utilized to separate the left chest portion 154 from the center back portion 138, as shown in FIG. 8. The pull tabs 146 and 150 can extend about the circumference of the right chest portion 134 and left chest portion 154 so as to completely separate these portions from the main body portion 160 and the center back portion 138. Other pull tabs 168 and 172 can be provided to separate the remaining portions of the life preserver 130.

This invention can be embodied in other forms without departing from the spirit or central attributes thereof, and accordingly, reference should be had to the following claims, rather than to the foregoing specification, as indicated in the scope of the invention.

I claim:

1. A life preserver assembly, comprising:
a substantially planar main body portion formed from a buoyant material and separation means defining in said main body portion at least one life preserver, and permitting said life preserver to be removed from said main body portion; and
said life preserver comprising at least two portions, and connecting structure for connecting the life preserver portions, wherein said connecting structure comprises fastening structure for securing said connecting structure to said life preserver portions.

2. A life preserver assembly, comprising:
a substantially planar main body portion formed from a buoyant material and separation means defining in said main body portion at least one life preserver, and permitting said life preserver to be removed from said main body portion, said separation means comprising scoring between said life preserver and said main body portion; and
said life preserver comprising at least two portions, and connecting structure for connecting the life preserver portions, said connecting structure comprising fastening structure for fastening said life preserver to said main body portion.

3. A life preserver assembly, comprising:
a substantially planar main body portion formed from a buoyant material and separation means defining in said main body portion at least one life preserver, and permitting said life preserver to be removed from said main body portion, said separation means comprising a frangible portion defining the outline of said life preserver, and a means for breaking said frangible portion, said means for breaking comprising a pull cord.

4. A life preserver assembly, comprising:
a substantially planar main body portion formed from a buoyant material and separation means defining in said main body portion at least one life preserver, and permitting said life preserver to be removed from said main body portion; and
arm hole portions, said arm hole portions being removable from said life preserver to create arm holes.

5. A method for storing a life preserver, comprising the steps of:
placing said life preserver in a substantially planar main body portion, said main body portion comprising separation means for separating said life preserver from said main body portion;
storing said main body portion; and
removing said life preserver from said main body portion.

* * * * *